Sept. 25, 1928.
G. L. LJUNGLOF
WORKHOLDER
Filed Sept. 26, 1923
1,685,167
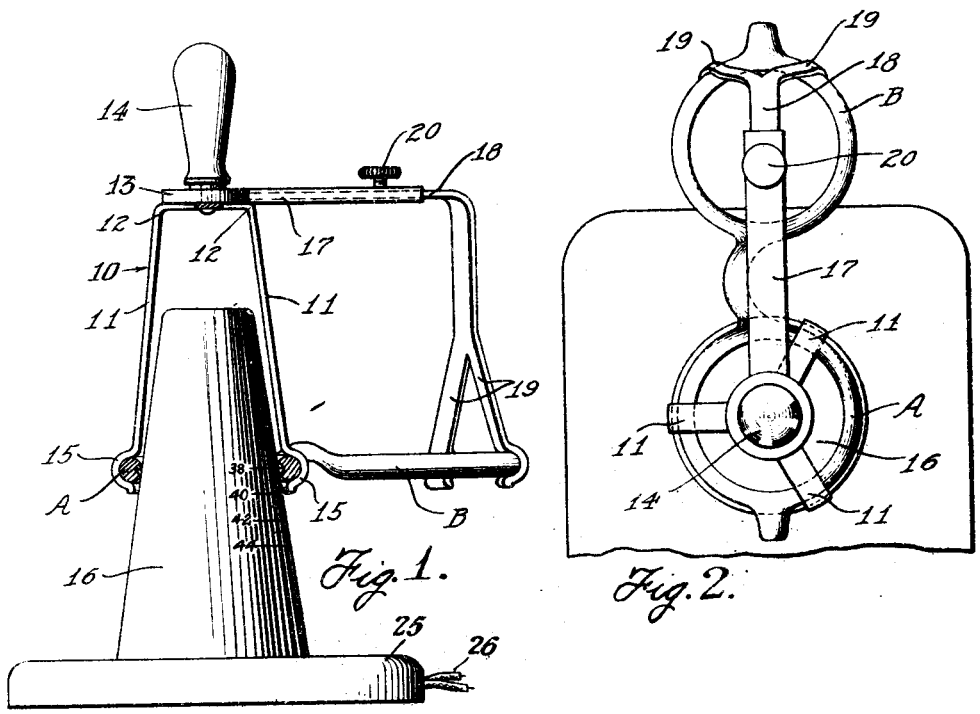
INVENTOR
GEORGE L. LJUNGLOF
BY
Harry H. Styll
ATTORNEY Patented Sept. 25, 1928.

1,685,167

UNITED STATES PATENT OFFICE.

GEORGE L. LJUNGLOF, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

WORKHOLDER.

Application filed September 26, 1923. Serial No. 665,032.

This invention relates to improvements in work holders and has particular reference to a work holder which is adaptable for handling ophthalmic frames, while stretching same preparatory to the insertion of lenses therein.

I am aware that prior to my invention the stretching of non-metallic ophthalmic rims has been accomplished largely by the aid of a heated cone on which the rims have been pressed against an increasing diameter. In the use of such a device, however, operators have frequently burned their fingers in applying or removing the rims and the utility of the cone has been thereby lessened. Other rim stretching tools comprise pliers having especially shaped jaws which engage the interior of the lens rim and which apply pressure to diametrically opposite points of the rim. This latter form of tool stretches the rim in an elliptical shape, which is objectionable.

By my invention I have overcome the objectionable features of the prior art and have provided means for applying an ophthalmic rim to a heated cone without any danger or possibility of the operator burning his fingers.

One of the objects of my invention is to provide a work holder by means of which composition rims may be expanded uniformly with a minimum amount of effort.

Another object is to provide such a device whereby rims may be stretched without danger of the operator burning his fingers.

A further object is to provide such a device whereby the two rims of an ophthalmic frame will be held in proper alignment while one is being stretched.

Other objects and advantages will be apparent from the following description taken in connection with the accompanying drawings, wherein similar reference characters designate corresponding parts throughout the several views.

In the drawings:

Figure 1 is an elevation partially in section showing the assembled device and

Figure 2 is a top plan view of the device as illustrated in Figure 1.

Referring to Figures 1 and 2, my improved work holder comprises essentially a spider 10 having radial arms 11 which are offset as at 12 adjacent their upper end. The spider is secured to a disc 13 carried by a suitable handle member 14 for purposes of easy manipulation. The lower end of each arm 11 is offset as at 15 for the ready reception of the rim A of an ophthalmic frame.

From this it will be seen that the arms 11 being of suitable flexible material, will clamp the rim A, whereupon it may be applied to the heated cone 16 and by exerting pressure to the handle 14 the rim A will be expanded as it is forced downwardly on the cone. The cone may be heated by means of an internal electric heating element or by application to a hot plate, or by gas.

The spider 10 may be provided with any number of resilient arms 11 and they may be of any form required. For example, there may be three arms, as in Figure 2, all formed of a single piece of sheet material, secured to the disc 13, as clearly shown.

The heating cone 16 is supported by the base member 25 into which the electric leads 26 for heating the cone are led. The heating cone 16 is in the form of a conical rim stretcher block rising from the base member 25. The rim holder comprises the spider 10 having the arms 11 and the holding loop 15. The spider 10 is secured to the supporting member or disc 13 by means of the handle 14. The lateral extension member 17 for carrying the depending arm 18 to support the other eye B of the ophthalmic frame is secured to the supporting member or disc 13 which is secured to the handle 14.

When the rim of a nonmetallic frame is applied to a heated cone the material softens and quite frequently the unsupported rim will tend to sag, bending the bridge and forcing the two rims out of their proper alignment. In order to prevent such action I may provide a transverse supporting arm 17, as clearly shown in Figures 1 and 2, this arm being carried by the handle 14. This supporting member 17 is telescoping as at 18, and offset at its outer end so as to form the depending bifurcated finger members 19, which are adapted to engage the outer periphery of the second rim B of the ophthalmic frame. The telescoping feature of the transverse arm allows for different sizes of frames and, of course, there is a locking means 20 for securing the fingers 19 in adjusted position. There will be no possibility for the rim B to sag because of the heating of the rim A and the adjacent portion of the bridge.

The heated cone 16 is preferably provided with a scale indicating various standard lens sizes so that the operator will know when he has forced the rim A a suitable distance to expand it the desired amount. After the rim has been so expanded the whole device is withdrawn from the cone 16 and the frame disconnected therefrom so that a new lens may be inserted and as the material again cools it contracts to the size of the lens and holds the same firmly in place.

From the foregoing it will be evident that I have produced a work holder which is simple in construction, will be strong and durable in service, and an improvement in the art. It is to be understood that changes may be made in the form, proportions and arrangement of parts, and I herein reserve the right to make such changes within the scope of the claims without departing from the spirit of my invention.

Having thus described my invention, what I claim is:

1. A device of the character described comprising a base, a conical rim stretching plug rising from the base, a lens rim holder associated with said base and having a handle, a supporting member on the handle, depending arms extending from the supporting member, said arms having rim engaging portions, said supporting member being provided with a lateral extension, and an arm depending from the extension having rim engaging portions.

2. In a device of the character described a base, a conical rim stretching block rising from the base, a rim holder associated with said base and having a handle, a supporting member on the handle, depending arms extending from the supporting member, said arms having rim engaging portions, said supporting member being provided with a lateral extension and with a slide-way, an arm in the slide-way having a portion depending therefrom having lens rim engaging portions and means to lock the last named arm in the slide-way.

3. In a device of the character described comprising a base, a conical rim stretching plug rising from the base, a rim holder associated with said base and having a handle, a supporting member on the handle, depending arms extending from the supporting member, said arms having rim engaging portions, and an arm extending laterally from the supporting member and having a bifurcated portion depending therefrom with lens rim engaging members thereon.

GEORGE L. LJUNGLOF.